April 21, 1931.  C. KLIEM  1,801,963
EXTENSIBLE JOINT AND FASTENER CONSTRUCTION FOR BRACELETS
Filed Feb. 8, 1929
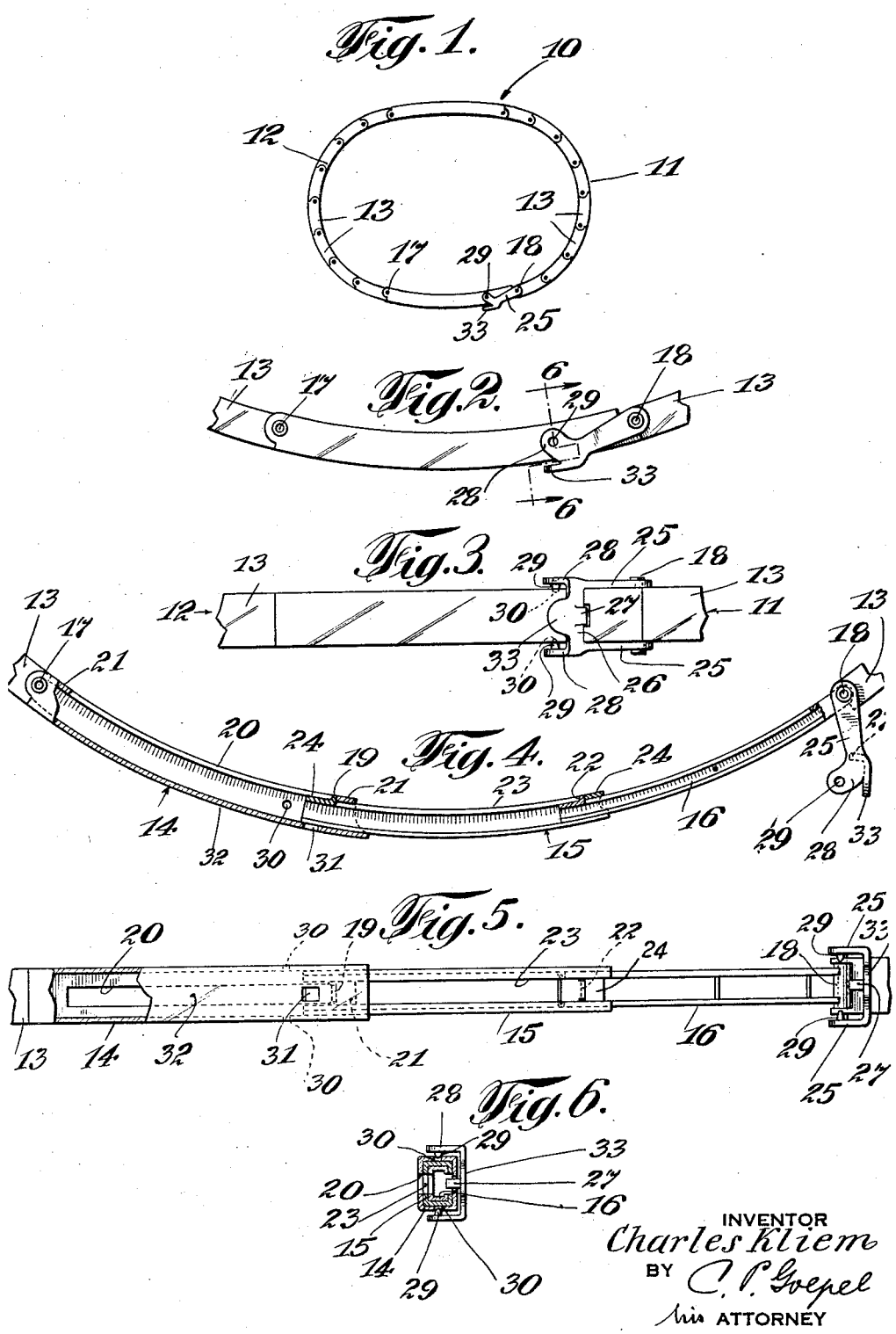
INVENTOR
Charles Kliem
BY
his ATTORNEY Patented Apr. 21, 1931

1,801,963

UNITED STATES PATENT OFFICE

CHARLES KLIEM, OF HILLSIDE, NEW JERSEY, ASSIGNOR TO SHIMAN MFG. CO. INC., OF NEWARK, NEW JERSEY, A CORPORATION OF NEW YORK

EXTENSIBLE JOINT AND FASTENER CONSTRUCTION FOR BRACELETS

Application filed February 8, 1929. Serial No. 338,597.

My invention relates generally to bracelets, and has for its primary object the provision of certain improvements in a telescopic joint and fastener construction by means of which the bracelet, after being passed over the hand, can be contracted to fit about the wrist and firmly secured in a contracted condition.

Another object of the invention is the provision of a novel construction of this character in which the joint comprises a plurality of links connected to have telescopic function, the links being constructed and connected for longitudinal extension so as to lengthen the joint and thereby expand the bracelet for its application or removal over the hand, and, conversely for retraction, one within the other, in nested arrangement so as to shorten the joint and thereby contract the bracelet about the wrist; and a further object is the provision in conjunction with an extensible joint, of a novel fastener in the form of a clasp device constructed and arranged to be swung into and out of a position in which it will secure the links of the joint in nested condition.

Another object of the invention is the provision of a construction in which the largest and strongest link, within which the other links of the joint are telescoped, will on the closing of the clasp device constitute the effective part for connecting the sections of the bracelet.

Among other objects of my invention is the provision of a construction of the character described which shall be attractive in appearance, small in size, not liable to get out of order, and highly convenient in use.

Other objects and aspects of the invention will appear hereinafter.

The invention consists in the construction and in the arrangement or arrangements of parts as hereinafter described and set forth in the annexed claims.

The invention will be best understood by reference to the accompanying drawing forming a material part of this specification, and in which:—

Fig. 1 represents an elevation of a bracelet containing my telescopic joint and fastener construction;

Fig. 2 represents an enlarged fragmentary elevation, showing the fastener device as it appears when engaged with the main link whereby to secure the bracelet in an adjusted condition;

Fig. 3 represents a plan view of the parts shown in Fig. 2;

Fig. 4 is a detailed, longitudinal, sectional view through the extension joint with the link members thereof fully extended;

Fig. 5 is a plan view, with parts broken away, of the members illustrated in Fig. 5; and Fig. 6 is a cross section taken approximately on the line 6—6 of Fig. 2.

In the accompanying drawing, my invention is illustrated as embodied in a flexible, wrist-encircling bracelet designated in general by the numeral 10 and consisting of connected sections or halves 11 and 12, each composed of pivotally connected links 13; and the particular form of construction of my invention, as selected for illustration, comprises a longitudinally extensible joint which connects the sections or halves 11 and 12 and consists of the links 14, 15 and 16 adapted to be nested or telescoped, one within the other, when the bracelet is contracted to fit about the wrist and adapted to be extended as shown in Figs. 4 and 5 whereby to expand the bracelet circumferentially when it is to be passed over the hand.

Each of the links 14, 15 and 16 comprises an elongated box-shaped structure and these links are constructed and arranged for longitudinal sliding movement one within the other. Thus, in the present instance, the link 14 represents the main or outer link into which the intermediate link 15 is longitudinally insertible, while the inner link 16 is longitudinally insertible within the intermediate link 15 so that these links may be telescoped one into the other and therefore nested within the main or outer link 14.

The main or outer link 14, which comes at one end of the extensible joint, is pivotally united by the link pintle 17 to the bracelet section or half 12; while the inner link 16, which comes at the opposite end of the extensible joint, is pivotally united by a link pintle 18 to the opposite section or half 11.

In the illustrative embodiment the links 14, 15 and 16 are connected for longitudinal sliding movement by slidably interfitting lug and guide means. To this end the intermediate link 15 is represented as being provided with a lug 19 slidable in slot 20 extending longitudinally of the inner face of the main link 14, the cross-pieces 21 which define the ends of the longitudinally extending slot 20 constituting abutments against which the lug 19 may strike whereby to limit longitudinal sliding movement of the link 15. In a similar manner, the link 16 is provided with a lug 22 slidably fitting the slot 23 which extends longitudinally of the intermediate link 15 in the inner side thereof, the cross pieces 24, which define the ends of the slot 23, constituting abutments for the lug 22 whereby to limit the longitudinal sliding movement of the inner link 16. By this arrangement, the links 16 and 15 are slidable inwardly into the link 14 to be nested therein; and in thus moving the links into nested arrangement, the extent of the joint between the bracelet sections 11 and 12 is shortened thereby contracting the bracelet circumferentially. The links may differ, and preferably do differ, in cross section to such extent that they will have, when extended with the lugs (19 and 22) engaging the cross pieces (21 and 24), a limited lateral movement with respect to each other in order to respond to the movements of the muscles of the wrist; and in this connection, according to a feature of the arrangement, the said lugs are adapted to swing as pivots on the cross pieces so as to provide for relative lateral movements of the links in extended relation.

It is in place to note here that the sliding link joint of my invention evidences in its simplest constructional form and arrangement, elongated links connected for lengthwise movement in sliding contact one upon and along the other; each of the links including in its construction, spaced elongated strips spaced apart to provide a guide opening between the strips (as the guide opening 20 of link 14 and the guide opening 23 of link 15), and cross pieces (as 21 and 24) connecting the link strips at the ends of the guide openings thereof, with guide lugs or projections (19 and 22) slidably engaged in the guide openings and adapted to abut against the cross pieces and prevent separation of the links in a lengthwise direction. This construction, while possessing the advantage of being sturdy and providing for compactness, is comparatively light in weight.

For securing the links together in a nested condition, I provide fastener means in the form of a clasp device comprising a pair of side arms 25 which are connected at their outer ends by a cross plate 26; the inner ends of these arms 25 being pivotally mounted upon the link pintle 18 by which the inner link 16 is united with the bracelet section or half 11. Cross plate 26 is provided with a projecting pin or stud 27, and it is formed with laterally projecting ears 28 carrying detent points or studs 29. With this construction and arrangement, when the links 15 and 16 have been closed into the main link 14 so as to nest therein, the end of the bracelet section or half 11 will abut the main link 20 as best illustrated in Fig. 2, so that the clasp device, swingably mounted on the pintle 18, can be readily closed upon the main link 14 with its ears embracing the sides thereof as best shown in Fig. 4. As the clasp device is closed upon the main link 14, its detent studs 29 snap into suitable sockets 30 provided in the sides of the main link and at the same time the pin 27 passes through a suitable keeper opening 31 provided in the outer face 32 of the main link.

Manifestly, by sliding the links into nested arrangement the joint will be shortened thereby contracting the bracelet circumferentially; and when the clasp device has been snapped into interlocking arrangement with the main link, the bracelet will be securely fastened in contracted condition in a manner in which the main link 14 constitutes the effective link between the sections or halves 12 and 11. In order to lengthen the joint and thereby expand the bracelet, it is only necessary to disengage the clasp from the main link 14, for which operation cross plate 26 is provided with a central enlargement 33 adapted to be engaged by the fore part of the thumb or the thumbnail in order to provide means whereby to facilitate the disconnection of the clasp from the main link.

My extensible joint and fastener construction is exceedingly simple, strong and efficient, and it is thoroughly satisfactory in use. As previously observed, the main link 14, when the clasp is closed thereon, constitutes with the clasp the effective connecting part between the sections of the bracelet; and it is to be observed in this connection that the outer face 32 of the main link 14 may be marked in simulation of the links 13 and may be marked in simulation of the links 13 and may be correspondingly ornamented or embellished so that it will not be conspicuous but will conform in general with the appearance of the link sections. The clasp device, in addition to its utility, is neat and attractive, having the appearance of an ornamental buckle as will be observed from an inspection of Fig. 4.

It will be apparent from the foregoing that I have produced a novel and useful extensible joint and fastener construction which embodies the features of advantage enumerated in the statement of invention and the above description, and while, I have, in the present instance, shown and described a preferred embodiment thereof, it is to be understood that it is susceptible of modification in various details without departing from the spirit of my invention or sacrificing any of its advantages.

I claim:

1. A bracelet having an extensible joint comprising a plurality of telescoping links arranged for lengthwise sliding movement, cooperating lug and guide means between the links arranged to limit the lengthwise sliding movement thereof, one of the links constituting an outer link and another constituting an inner link, and a clasp hinged to the bracelet at a point adjacent to the inner link and adapted to be interengaged with the outer link whereby to fasten the bracelet in a condition of adjustment.

2. In a bracelet, embodying a bracelet section having free ends, a link joint connected with the free ends of the section and adapted to be extended and contracted longitudinally between the same, said joint composed of links consisting of longitudinal metal sidestrips joined by cross-pieces, said links differing in cross dimension and one entering at one end through the receiving end of the other, the side-strips of the larger link forming inside channels in which the side-strips of the smaller link are movable, the crosspieces adjacent the entering and receiving ends of the respective links cooperating as stops to prevent the escape of the end of the smaller link from the end of the larger link when the joint is fully extended longitudinally.

3. In a bracelet, embodying a bracelet section having free ends, a link joint connected with the free ends and adapted to be extended and contracted longitudinally between the same, said joint composed of links consisting of longitudinal metal strips joined by crosspieces, said links differing in cross dimension, and one entering at one end through the receiving end of the other, the side-strips of the larger link forming inside channels in which the side-strips of the smaller link are movable, the cross-pieces adjacent the entering and receiving ends of the respective links cooperating as stops to prevent the escape of the end of the smaller link from the end of the larger link when the joint is fully extended longitudinally, and pivoted clasp means for securing the links in contracted relation and against longitudinal extension.

4. In a bracelet, a link joint comprising a pair of longitudinal links associated together for longitudinal sliding movement with respect to each other so as to expand and contract the joint, each link including spaced longitudinal strips spaced apart to provide a longitudinal guide opening between the strips, a member connecting the strips of one link so as to define one end of the guide opening therebetween and affording a stop, a member connecting the longitudinal strips of the other link and having a projection received in said guide opening, said projection adapted, when the links are extended, to engage said stop to prevent separation of the links and also adapted to swing as a pivot on the stop member to provide for relative lateral movement of the links in extended relation.

5. In a bracelet, the combination of a bracelet section having terminal portions, a link joint connected between the terminal portions and including at least two links which are constructed and arranged for sliding movement, one lengthwise along the other, to be thereby extended and contracted to vary the distance between the terminal portions of the section, sliding connections between the links comprising spaced strips on one link spaced apart to provide a longitudinal guide opening therebetween, a projection on the other link received in the guide opening and sliding in contact with the strips, and a cross piece connecting the strips in limitation of the opening and serving as a stop for the projection so as to prevent separation of the links, said cross piece also adapted to serve in the capacity of a fulcrum for the canting of the projection thereon to allow relative lateral movement of the links when the latter are extended.

6. In a bracelet, consisting of a bracelet section having terminal portions, a sliding link joint connected between the terminal portions and adapted to be extended and contracted for extending and contracting the bracelet, said link joint including at least two longitudinal links arranged for sliding movement, one lengthwise upon and along the other, one of said links including in its construction spaced longitudinal strips spaced apart to provide a longitudinal guide opening between the strips and a cross piece connecting the strips at one end of the guide opening, guide means on the other link slidable along said strips in sliding contact therewith and including a projection having sliding fit in said guide opening, said projection being adapted, when the links are extended, to abut against said cross piece and thereby prevent separation of the links.

7. In a bracelet, a bracelet section, a sliding link joint incorporated in the section and adapted to be extended and contracted for extending and contracting the bracelet, said link joint including at least two elongated links arranged for sliding movement; one lengthwise upon and along the other, the construction of each of said links including a pair of spaced strips spaced apart to provide a longitudinal guide opening between the strips, guide means connected with the strips of one link and slidable in contact with the strips of the other link so as to maintain the links in lengthwise alignment for sliding movement, and stop portions on the respective links positioned thereon at the ends of the guide openings therein for engagement one with the other when the links are extended, to prevent separation of the links in a lengthwise direction.

In testimony that I claim the foregoing as my invention, I have signed my name hereto.

CHARLES KLIEM.